US011802738B2

(12) United States Patent
Tiwari et al.

(10) Patent No.: US 11,802,738 B2
(45) Date of Patent: Oct. 31, 2023

(54) WATER COOLING SYSTEM

(71) Applicants:Ratnesh Tiwari, Hyattsville, MD (US); Alexander Dessiatoun, Colmar Manor, MD (US); David Eugene Smith, Boyds, MD (US)

(72) Inventors: Ratnesh Tiwari, Hyattsville, MD (US); Alexander Dessiatoun, Colmar Manor, MD (US); David Eugene Smith, Boyds, MD (US)

(*) Notice: Subject to any disclaimer, the term of this patent is extended or adjusted under 35 U.S.C. 154(b) by 0 days.

(21) Appl. No.: 15/733,464

(22) PCT Filed: Feb. 4, 2019

(86) PCT No.: PCT/US2019/016481
§ 371 (c)(1),
(2) Date: Aug. 3, 2020

(87) PCT Pub. No.: WO2019/152913
PCT Pub. Date: Aug. 8, 2019

(65) Prior Publication Data
US 2021/0102758 A1 Apr. 8, 2021

Related U.S. Application Data

(60) Provisional application No. 62/626,128, filed on Feb. 4, 2018.

(51) Int. Cl.
*F28D 15/02* (2006.01)
*E03B 11/02* (2006.01)

(52) U.S. Cl.
CPC .......... *F28D 15/0275* (2013.01); *E03B 11/02* (2013.01); *F28D 15/0283* (2013.01)

(58) Field of Classification Search
CPC ............. F28D 15/0275; F28D 20/0034; F28D 20/0039; F28D 20/0043; F28D 2020/0078;
(Continued)

(56) References Cited

U.S. PATENT DOCUMENTS 2,499,736 A * 3/1950 Af Kleen ................ F25D 3/005
62/119
4,293,030 A * 10/1981 Rambach ................ F28D 15/00
165/104.32
(Continued)

FOREIGN PATENT DOCUMENTS

GB 2314149 A 12/1997
GB 2334568 A 8/1999
WO WO-2017086563 A1 * 5/2017 ............. G21C 15/18

*Primary Examiner* — Tavia Sullens
*Assistant Examiner* — Khaled Ahmed Ali Al Samiri
(74) *Attorney, Agent, or Firm* — ROSENBERG, KLEIN and LEE

(57) ABSTRACT

A water cooling system for showers has a water tank filled with water to be cooled, and a heat exchange loop which includes an internal heat exchange (HX) evaporator immersed into the water within the water tank, and a condenser HX unit positioned externally above the internal evaporator unit. A refrigerant in the loop absorbs the heat from the water in the water tank, circulates in the HX loop, and passes to the condenser HX unit to release heat to ambient air. The water cooling process is passive and does not require any form of external energy. The subject heat transport attains a minimal thermal resistance by two-phase evaporation and condensation process (heat piping) which achieves positive flow at as low as 0.2° C.-1° C. temperature difference between the ambient air and the tank water.

9 Claims, 9 Drawing Sheets

(58) Field of Classification Search
CPC ...... F28D 15/0283; E03B 11/02; Y02E 60/14; F24F 2005/0025; F24F 2005/0032; F28F 5/0017
See application file for complete search history.

(56) References Cited

U.S. PATENT DOCUMENTS

| | | | | |
|---|---|---|---|---|
| 5,195,575 | A * | 3/1993 | Wylie | G21C 15/18 |
| | | | | 376/367 |
| 6,912,864 | B2 * | 7/2005 | Roche | F28F 1/325 |
| | | | | 62/515 |
| 2007/0028626 | A1 | 2/2007 | Chen | |
| 2011/0083827 | A1 * | 4/2011 | Salyer | F28D 20/02 |
| | | | | 165/165 |
| 2011/0289951 | A1 | 12/2011 | Furlong et al. | |
| 2012/0073789 | A1 * | 3/2012 | Bhattacharya | G06F 1/20 |
| | | | | 165/104.34 |
| 2012/0204590 | A1 * | 8/2012 | Frigiere | H02G 5/10 |
| | | | | 62/259.2 |
| 2012/0227730 | A1 | 9/2012 | Teoh | |

* cited by examiner

WATER COOLING SYSTEM

REFERENCE TO RELATED APPLICATIONS

This Utility Patent Application is a National Stage entry of PCT Application PCT/US2019/016481 filed on 4 Feb. 2019 and is based on the Provisional Patent Application Ser. No. 62/626,128 filed on 4 Feb. 2018.

FIELD OF THE INVENTION

The present invention is directed to a water cooling system requiring minimal energy consumption, and in particular, to water cooling systems for showers required in regions with hot climate conditions.

More in particular, the present invention is directed to inexpensive shower systems adapted specifically to regions with hot climate conditions and capable of highly efficient cooling of water for consumption with no (or minimal) power requirements.

The present invention is also directed to shower systems (specifically, safety showers) equipped with a water cooling unit capable of reducing water temperature to approximately 16° C.-38° C. (60° F.-100° F.) practically with no need for a power supply.

The present invention is further directed to a shower system provided with a water tank and a cooling unit operatively coupled to the water tank for cooling water inside the tank supported by a heat pipe system (heat exchange loop) configured with interconnected heat exchangers operating to absorb heat of water in the water tank and to release the absorbed heat into the ambient atmosphere.

In overall inventive concept, the present system is directed to water (or other medium) cooling to a required temperature level acceptable for consumption by a user, where the cooling process is supported by heat piping operational principles using an evaporator heat exchange (HX) unit immersed into water filling a water tank and a condenser HX unit positioned outside the water tank, where the water cooling is accomplished through absorption of the water heat, resulting in vaporization of the working fluid in the evaporator HX unit, and subsequent condensation of the working fluid vapor in the condenser HX unit, resulting in creation of a low pressure within the condenser HX unit which encourages the enhanced evaporation of the working fluid inside the evaporator HX unit, and where the heat is transferred to the ambient atmosphere from the condenser HX unit.

In addition, the present invention is directed to a shower system with a water cooler unit which includes an evaporator HX coil positioned inside a water tank and a condenser HX unit positioned on the top of the water tank in operative interconnection with the evaporator HX coil, and an enclosure positioned on the top of and in surrounding relationship with the condenser HX unit to create a chimney effect supporting a highly efficient energy cooling of water within the water tank.

The present invention is further directed to a water cooling unit for a shower system, which is supported by a heat exchange (HX) loop formed with an evaporator HX unit (positioned in the water tank) and the condenser HX unit (positioned above the evaporator HX unit and outside the water tank), and equipped with a vertical windbreak member located below the condenser HX unit to direct the wind from various directions vertically upward in the condenser HX unit to further increase the efficiency of the water cooling.

The present invention is also directed to a water cooler unit for showers supported by a number (at least two) of HX loops filled with different working mediums to maintain the efficiency of the water cooling process while preventing any possibility of toxic working fluid being mixed with the tank water.

In addition, the present invention is directed to a highly efficient water cooling system equipped with a heat exchanger (HX) loop filled with a working medium (refrigerant) and a phase changing fluid, where the phase-changing fluid solidifies at a predetermined temperature and thus stops circulation of the working medium in the HX loop to retain the water temperature at the predetermined level attained as the result of the cooling process.

BACKGROUND OF THE INVENTION

Providing water which would have a safe temperature range for showers (such as safety showers, as well as residential showers) is a long-standing problem in hot climates such as those typical for the Middle East, Africa, Australia, South America, and other dry and arid areas.

Safety showers are widely used in various laboratories and industrial facilities to protect employees from burns from chemical spills, and other hazardous conditions. The ANSI (American National Standards Institute) established the requirement of water temperature in a shower to range between 16° C. and 38° C. (60° F.-100° F.). Heaters are used usually in the cold climates to heat water to within this temperature range. However, in warm climates, the showers must be equipped with chillers (coolers) which are used to cool water for consumption by users.

Unlike the heaters (resistive heaters), water chillers (coolers) are usually expensive. Chiller related costs increase exponentially if the location of the shower is in hazardous areas (such as those where flammable gases, combustible dust, etc. are present) due to the fact that it requires hazardous area classified electrical and electronic systems. Retrofitting a shower with electrical chillers is challenging as it requires installing electrical cables from control stations in the ground.

In typical process plants, oil and gas plants, chemical plants, etc., multiple safety showers are located across the plants and are connected with water supply lines. In case of an emergency, the showers can be used to prevent major injuries to the workers. However, during summer months, the temperature of the incoming water can reach 42° C. or higher, which is not safe for use in the safety showers. Moreover, the showers are connected via long water lines where the portion of water is typically stagnant. This stagnant water is heated during hot summer days, when the temperature of water can reach close to 60° C. Use of such water in the safety shower can cause immediate scalding.

In order to provide cool water for the safety showers, as well as residential showers, chillers are used to cool water and to recirculate water into and out of the shower networks to ensure that no stagnant water is present in the pipeline. However, this approach requires the use of large chillers which continuously run to ensure the supply of cold water. This cost and energy intensive process requires overly expensive installation and maintenance. Also, operation of the chillers with the water recirculation requires additional pipe work, which is usually expensive in any industrial plant. The pipe work installation is extremely expensive if it is done as a retrofit in the existing plant, as this process requires the cutting of concrete grating to bury the recirculation line underground.

In remote areas with no direct water supply, safety showers use tank showers where a water tank is positioned above the shower and is cooled by an electrical system. Overhead water tanks used as a water storage in houses and villas are heated during summer months, that makes it impossible to have a cool shower without a water cooling system.

It would be highly desirable to develop a low cost miniature chiller system for showers which would consume a minimal amount of energy for water cooling, would keep water at the temperature range acceptable for use, require minimal installation costs (requiring only water plumbing for installation), and which would operate with a minimal temperature difference between elevated temperature of water and the ambient temperature.

SUMMARY OF THE INVENTION

It is therefore an object of the present invention to provide a highly efficient cooler for a shower system which would require minimal energy consumption to cool and keep water in a required temperature range (16° C.-38° C.), which incur only minimal maintenance costs, and operates with a very low temperature difference between water temperature and the ambient temperature.

It is another object of the present invention to resolve the issues of the existing chillers for shower systems by keeping the water temperature below the target of 38° C. even during hottest days when the daytime temperature rises above 50° C., and whereas the nighttime temperature remains about 38° C. for a few days, in the most efficient and low cost fashion.

The subject system testing during hot summer days has shown that the target results have been achieved. The experiments showed that water temperature remained well below 38° C. even during those days when the nighttime temperature did not fall below 38° C. This was due to the fact that the water was cooled during the cooler nights and the tank insulation prevented the water temperature from rising above 38° C.

In one aspect, the present invention is directed to a highly efficient water cooler applicable in various water using facilities, for example, for showers.

The subject water cooling system comprises a water reservoir filled with water at a temperature $T_1$ (which is an elevated temperature), and at least one heat exchange (HX) loop in contact with the water in the water reservoir. The HX loop is designed and operates to cool the water in the water reservoir to a temperature $T_2$ which is lower than $T_1$.

The HX loop is configured with (a) an evaporator HX unit positioned in the water reservoir in contact (partial or full) with the water, and (b) a condenser HX unit positioned outside the water reservoir in operative coupling with the evaporator HX unit via a loop tubing system. The condenser HX unit is positioned to be exposed to external air having an ambient temperature $T_3$ which is lower than $T_1$.

The HX loop is partially filled with at least one working medium which circulates between the evaporator HX unit and the condenser HX unit via the loop tubing system, thus cooling the water in the water reservoir from the elevated temperature $T_1$ to the low temperature $T_2$, wherein $T_3 \leq T_2 < T_1$.

The water reservoir is configured with a fluidly sealed receptacle of a predetermined volume defined between a bottom portion and a top portion of the water reservoir. A water inlet pipe extends in a fluid communication with the receptacle in the water reservoir to supply water having a temperature close to $T_1$ in the receptacle. A water outlet piping extends in a fluid communication with the receptacle in the water reservoir to output cooled water having the low temperature $T_2$ ranging from 16° C. to 38° C. acceptable for shower applications.

The loop tubing system of the HX loop includes a first loop tubing and a second loop tubing fluidly coupling the evaporator HX unit and the condenser HX unit. The working medium filling the HX loop circulates from the evaporator HX unit to the condenser HX unit through the first loop tubing and returns from the condenser HX unit to the evaporator HX unit along the second loop tubing.

When $T_1 > T_3$, the working medium absorbs heat produced by the water filling the receptacle, resulting in the working medium boiling in the evaporator HX unit, thus forming a working medium vapor. The working medium vapor passes through the first loop tubing into the condenser HX unit, and, being exposed to a lower temperature $T_3$ of the external air, condenses in the condenser HX unit, thus forming a condensate of the working medium. The condensate returns from the condenser HX unit to the evaporator HX unit through the second loop tubing, thus cooling the water in the receptacle of the water reservoir.

The condenser HX unit and the evaporator HX unit are preferably disposed in a substantially vertically aligned relationship one with respect to another, to provide favorable conditions for the condensate of the working medium to travel to the evaporator HX unit, for example, under influence of gravity assist. The condenser HX is tilted approximately 5°-45° from a horizontal orientation to provide favorable conditions of heat transfer.

The subject water cooling unit further includes a temperature activated valve operatively coupled to the HX loop to stop the circulation of the working medium therein once the temperature of the water inside the receptacle reaches substantially the temperature $T_2$ goal. The temperature activated valve may include a phase-changing medium filling the HX loop in addition to the working medium (refrigerant). The phase-changing medium solidifies within the loop approximately at the water's goal temperature $T_2$ in the receptacle, and thus stops the working medium from circulating through the HX loop.

The subject water cooling system may further include an auxiliary HX loop operatively coupled to the HX loop. The auxiliary HX loop is fluidly coupled to the condenser HX unit via a first auxiliary tubing, and to the evaporator HX unit via a second auxiliary tubing which is fluidly disconnected from the first auxiliary tubing. The first and second auxiliary tubing support circulation of a first and second working fluids, respectively, in a non-mixing fashion. The first and second working fluids may be similar one to another or differ one from another.

The subject water cooling system is capable of operating at a low difference (from 0.2° C. to 1° C.) between the water temperature $T_1$ and ambient temperature $T_3$.

The subject system may be further equipped with a chimney enclosure positioned on the top of the condenser HX unit in a surrounding relationship therewith, wherein the height of the chimney enclosure may range from 2 to 15 times of a depth of the condenser HX unit. The chimney enclosure may be configured with a plurality of compartments. In addition, a wind redirecting unit is attached at a bottom of the condenser HX unit to enhance heat transfer in the system.

The condenser HX unit is a heat exchanger including at least one multi-port tube and a plurality of fins, with the fins being spaced apart one relative to another at a distance ranging between 2 mm and 20 mm.

In an alternative embodiment, the subject system may comprise an accumulator loop interconnected between the first and second loop tubing of the HX loop to store therein the working medium.

In another aspect, the present invention is directed to a method of cooling water for showers by releasing the heat of hot water into the ambient atmosphere.

The subject method comprises the steps of:
filling a water reservoir with water at an elevated temperature $T_1$;
positioning at least one heat exchange (HX) loop in partial or full contact with water in the water reservoir'
configuring the HX loop with (a) an internal evaporator HX unit positioned in the water reservoir in thermal contact with the water, and (b) an external condenser HX unit positioned outside the reservoir in operative coupling to the internal evaporator HX unit via a system of loop tubing;
exposing the external condenser HX unit to ambient atmosphere having a temperature $T_3$,
partially filling a working medium in the HX loop, and
circulating the working medium between the internal evaporator HX unit and the external condenser HX unit via the system of loop tubing, thus cooling the water in the water reservoir from the temperature $T_1$ to a temperature $T_2$, wherein $T_3 \leq T_2 < T_1$.

The subject method further comprises the steps of:
positioning the external condenser HX unit and the internal evaporator HX unit in a substantially vertically aligned relationship one with respect to another, and
tilting the external condenser HX unit a predetermined angle of approximately 5°-45° from the horizontal orientation to provide favorable conditions for efficient heat exchange.

The subject method permits to maintain water in the water reservoir at the low temperature $T_2$ attained as a result of the cooling process by adding a phase changing fluid to the working medium in the HX loop, wherein the phase changing fluid solidifies at the temperature $T_2$, thus stopping circulation of the working medium in the HX loop.

The subject method is further optimized by coupling an auxiliary HX loop to the HX loop between the internal evaporator HX unit and the external condenser HX unit, and filling the auxiliary HX loop with a refrigerant medium different for the working medium filling the HX loop.

The subject method further enhances the cooling results by (a) positioning a chimney enclosure on the top of the external condenser unit in a surrounding relationship therewith, (b) configuring the chimney enclosure with a plurality of compartments, and (b) attaching a wind redirecting unit at a bottom of the external condenser HX unit to direct ambient wind vertically upward into the external condenser HX unit.

These and other objects and advantages of the present invention will be apparent from the detailed description of the preferred embodiments of the subject system and method in conjunction with the Patent Drawings of the subject Patent Application.

DETAILED DESCRIPTION OF THE PREFERRED EMBODIMENT

Figure 1:
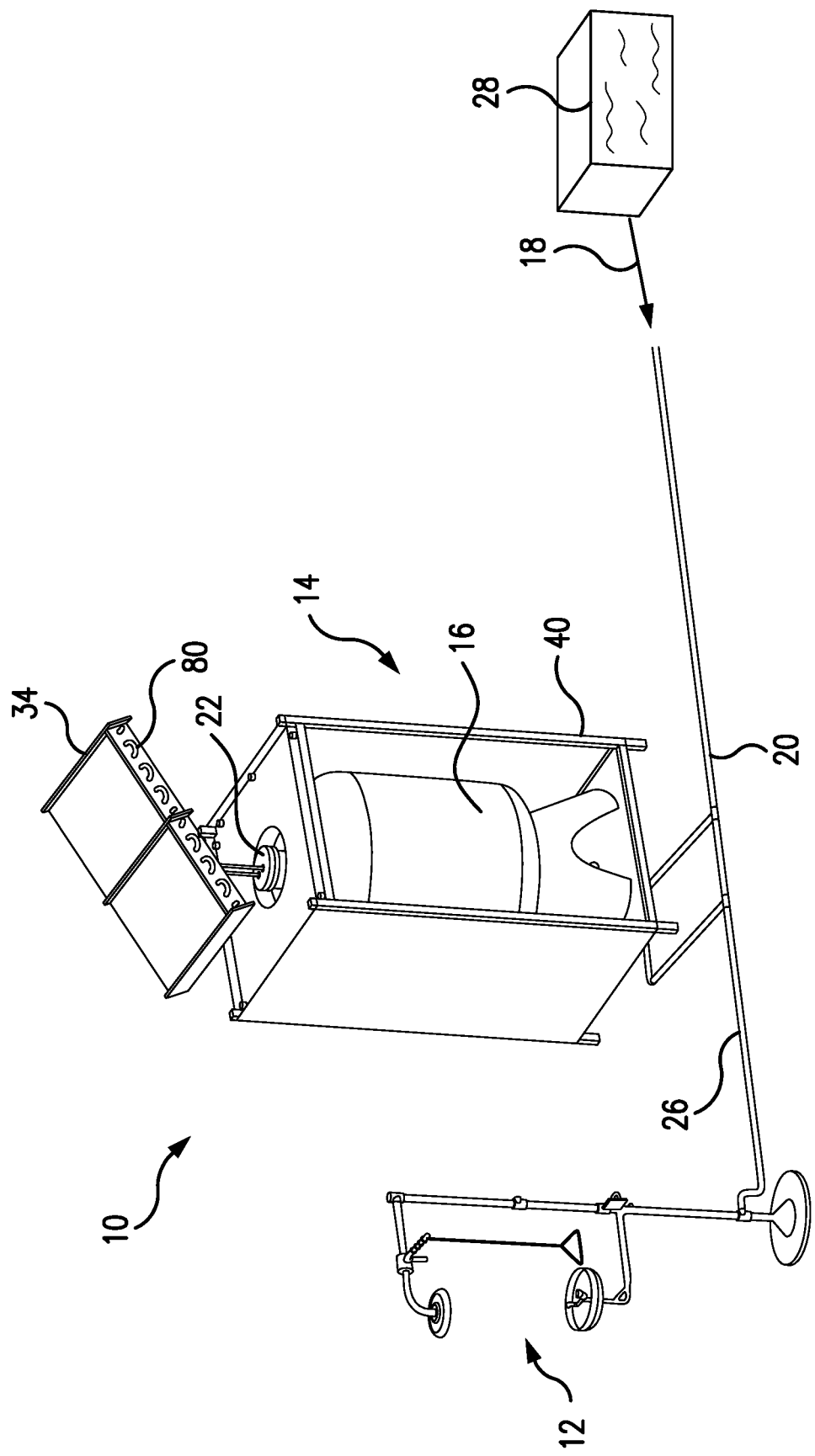
FIG. 1 is a 3D view of a shower system equipped with the subject water cooling unit.

Referring to FIGS. 1-5 and 7-10, the present system 10 is a highly efficient low-cost water cooling system for various applications where water is to be cooled for consumption. As one of numerous applications, the exemplary embodiment of the subject system will be further described in application to shower systems requiring water cooling. As such, the subject system 10 includes a shower 12 and a water cooling unit 14 (also referred to herein as a chiller). The chiller 14 is a highly efficient and economically viable system designed to cool water for showers, for example, safety showers at various plants, as well as residential showers, in warm climates without the need for any external energy. The subject shower system 10 avoids the cost for expensive electrical installation, and does not incur the energy costs associated with operation of conventional chillers, has no moving parts, and thus has negligible maintenance costs. The subject system uses cooler outdoor temperatures usually during the nighttime to keep the water temperature (once water has been cooled) within the limits established for a safe usage, thus further decreasing the operational costs.

The system 10 includes a water tank 16 (also referred to herein as a reservoir) which is filled with water 18 entering into the water tank 16 via the water inlet piping 20.

Figure 2:
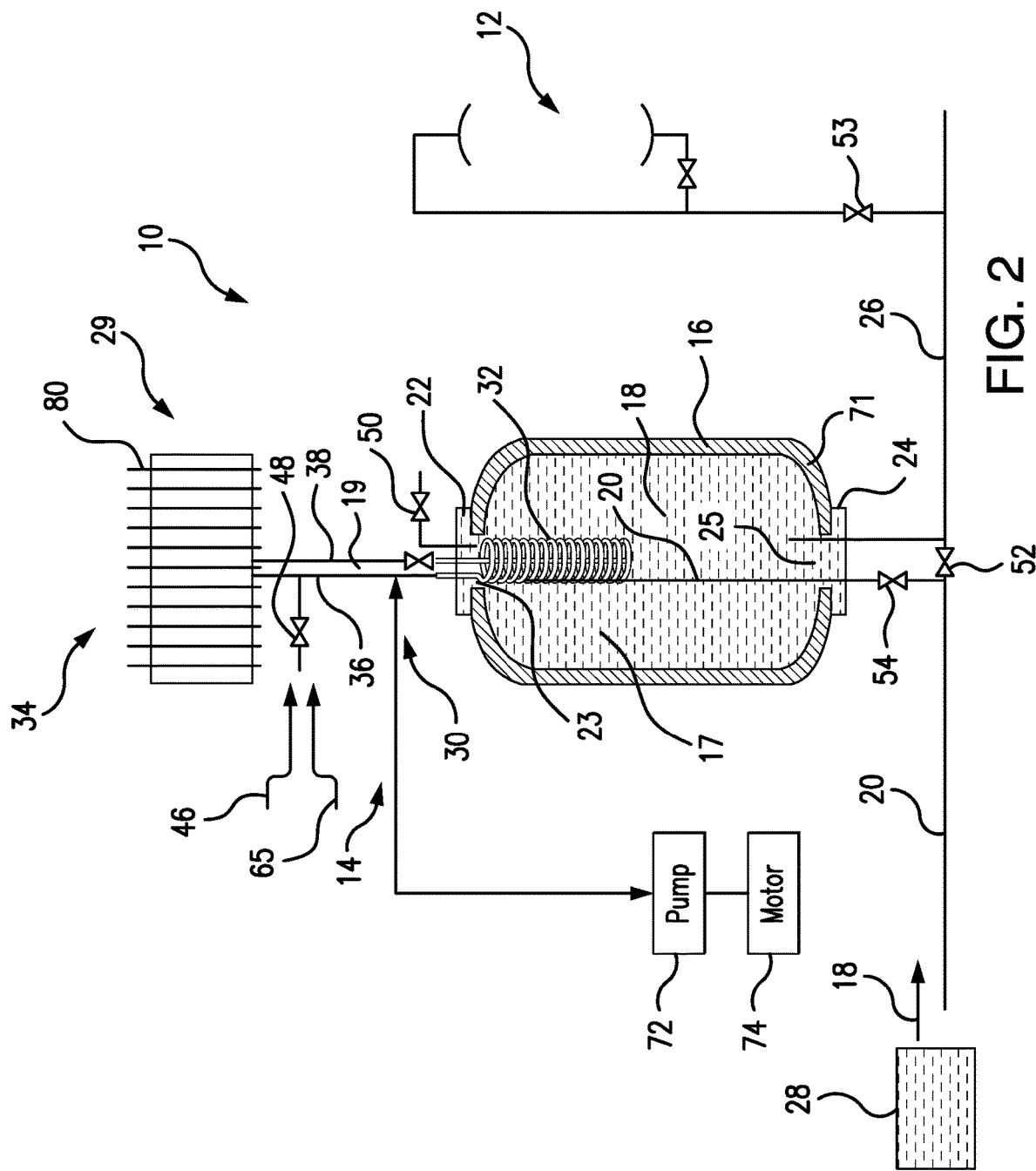
FIG. 2 is a schematic representation of the subject shower system equipped with the present water cooling unit.

As shown in FIG. 2, the water tank 16 has an upper lid 22 removably attached to, and sealing, a top opening 23 formed in the upper portion of the water tank 16. The water tank 16 also has a lower lid 24 removably attached to, and sealing, a lower opening 25 formed in the bottom portion of the water tank 16.

The water connections, as well as connections for the loop tubing, with the water tank, can be formed at any location (bottom, top, sides) in the tank.

In one implementation, shown in FIG. 2, the lower lid 24 is perforated to provide passage for the water inlet piping 20 as well as the water outlet piping 26.

Figure 3:
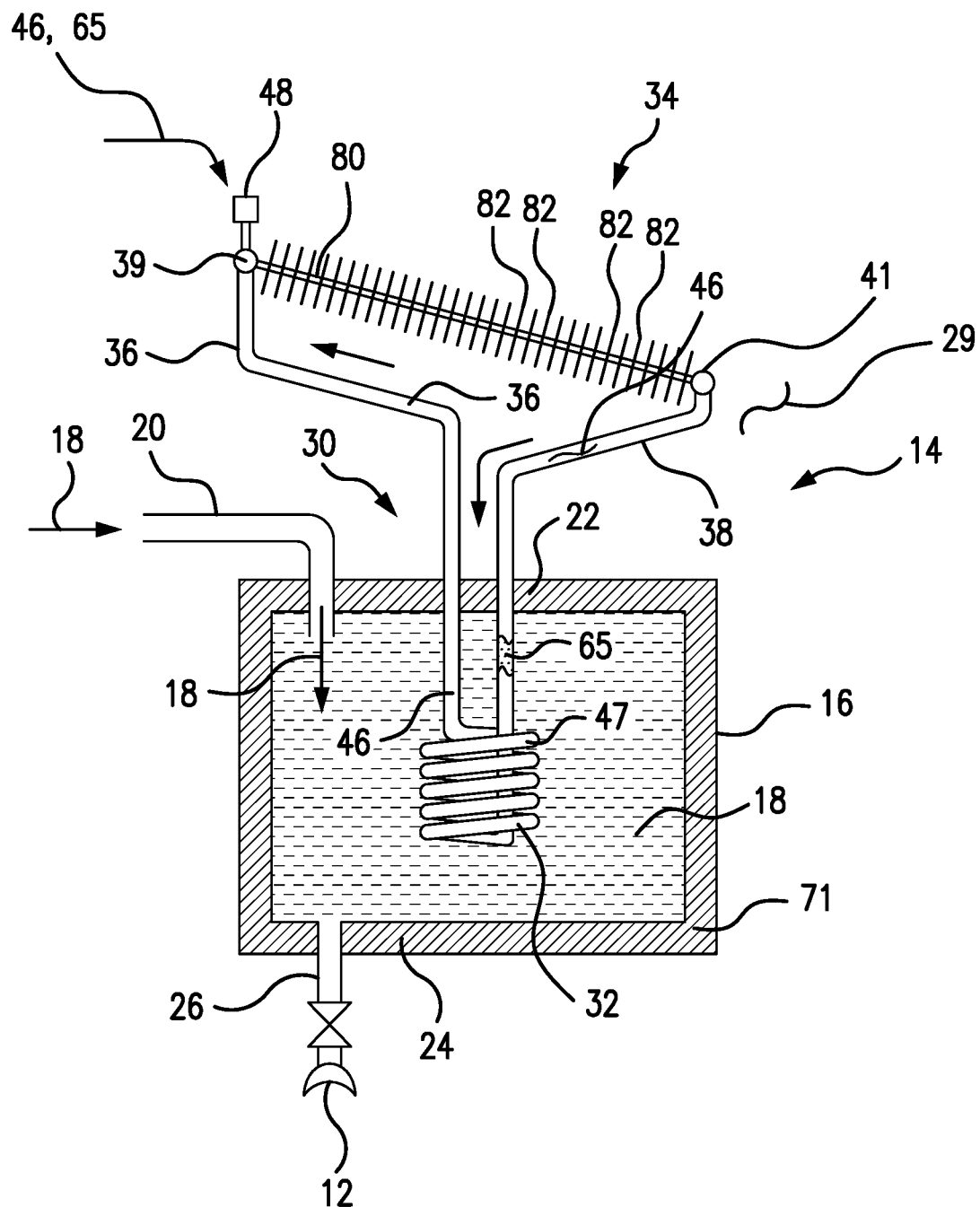
FIG. 3 is a schematic representation of the subject heat exchange loop in operational connection with water to be cooled.
Figure 9:
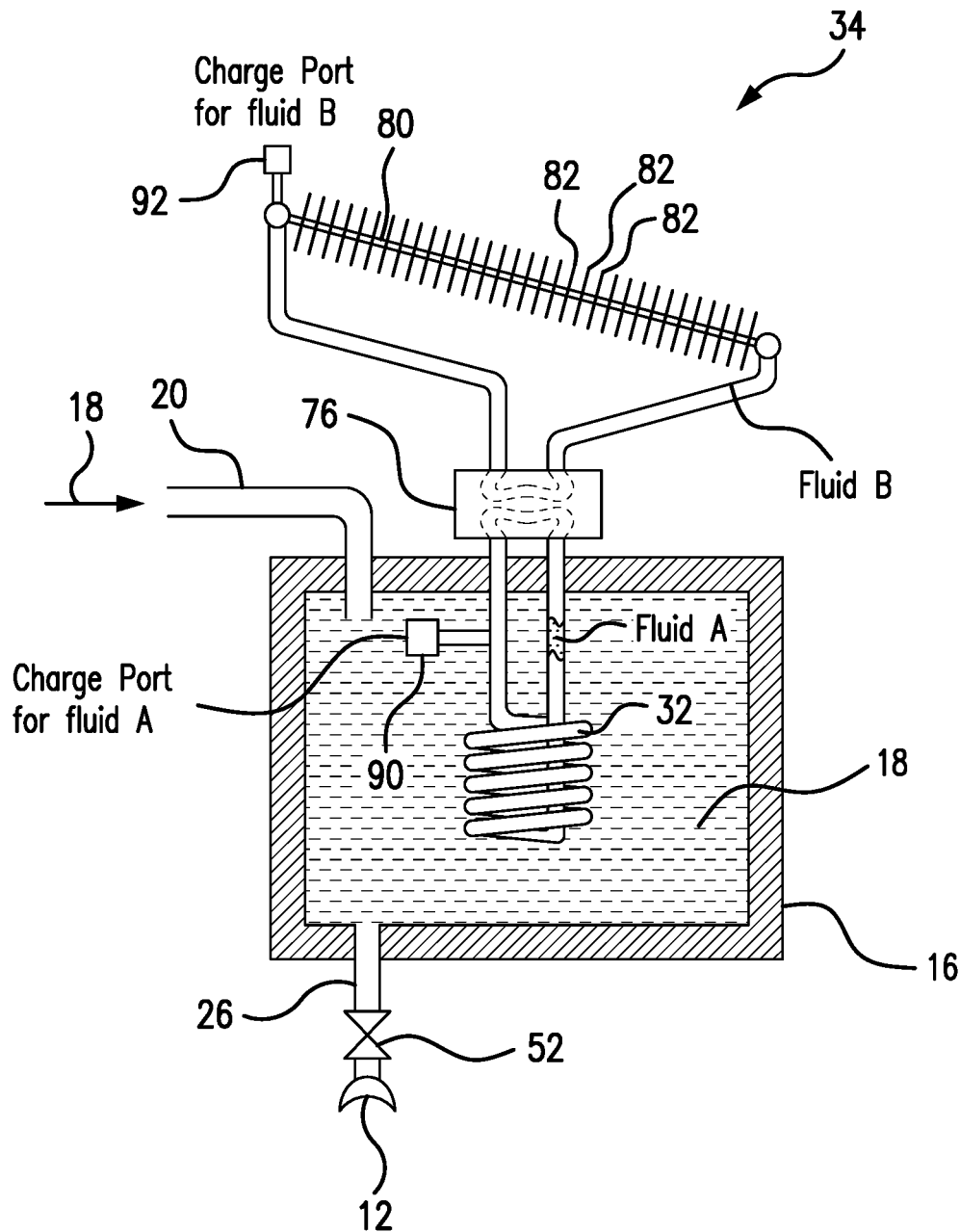
FIG. 9 is a schematic representation of an alternative embodiment of the subject water cooling unit equipped with an auxiliary heat exchange loop.

In another implementation, shown in FIGS. 3 and 9, the water inlet piping 20 may pass through the top wall of the water tank 16. Alternatively, the water inlet piping 20 may be coupled to the water tank 16 through a side wall.

Similarly, the piping may be coupled to the water tank 16 either at the top opening, the bottom opening, or a side opening.

Water is filled into the receptacle 17 defined in the water tank 16 via the water inlet piping 20 from a water source 28 which, as typical for hot climate regions, usually supplies water heated to temperatures exceeding the range 16° C.-38° C. appropriate for consumption in showers. The water outlet piping 26 connects the water tank 16 with the shower 12 to output the chilled water for consumption by a user.

In one embodiment, shown in FIGS. 2-3, the chiller unit 14 is represented in the subject shower system 10 by at least one heat exchange (HX) loop 30 which is built with an evaporator coil (or evaporator HX unit) 32, also referred to herein as an internal evaporator HX unit, and a condenser HX unit 34, also referred to herein as an external condenser HX unit, which is positioned outside the water tank 16 above the evaporator HX unit 32, preferably, in vertical alignment therewith.

In another embodiment, shown in FIG. 9, the HX loop 30 contains, in addition to the evaporator HX unit 32 and the condenser HX unit 34, at least one auxiliary heat exchange loop 76 (detailed in further paragraphs).

The HX loop 30 further includes a connecting loop tubing 19 coupled between the evaporator HX unit 32 and the condenser HX unit 34. The connecting loop tubing 19 passes through the top lid 22 of the water tank 16, and includes tubing line 36 which serves as an inlet to the condenser HX unit 34, and a return tubing line 38, which is the inlet tubing to the evaporator HX unit 32.

A working medium 46 circulates in the HX loop 30 along the connecting loop tubing 19 to support its operation, as will be detailed infra.

The subject chiller 14 operates as a two-phase heat exchange loop 30 which functions in a highly efficient fashion to chill water from an initial elevated temperature $T_1$ to a lower temperature $T_2$. The water cooler system 10 is a complex system where the heat transfer takes place between water having an initial elevated temperature $T_1$ and the ambient air 29 having an ambient temperature $T_3$ surrounding the external condenser HX unit 34, and depends on three different temperatures instead of two temperatures typical in a conventional single phase thermosiphon system. Three temperatures being the tank water elevated temperature $T_1$, ambient temperature $T_3$ ($T_1 > T_3 \geq T_2$), and saturation temperature $T_4$ of the working fluid 46. The subject design of the chiller 14 and the thermal HX loop 30 ensures that the heat transfer obtained in the subject system 10 is sufficient to meet the temperature requirements of the application.

By employing the evaporation/condensation model and design of the subject system 10, the HX loop 30 can be activated at a very small temperature difference between the water temperature $T_1$ and ambient temperature $T_3$ to achieve the temperature targets ($T_2$) within a reasonable time. As has been demonstrated in experiments, the subject two phase system can cool water in a 1000 L-1600 L water tank 16 from an initial (elevated) $T_1$ of 45° C. to the cooled $T_2$ of below 38° C. within a single night. The same amount of cooling at similar environmental conditions performed by a conventional single-phase water-based or other thermosiphon-based cooling systems requires as long as about 3 days.

Figure 4:
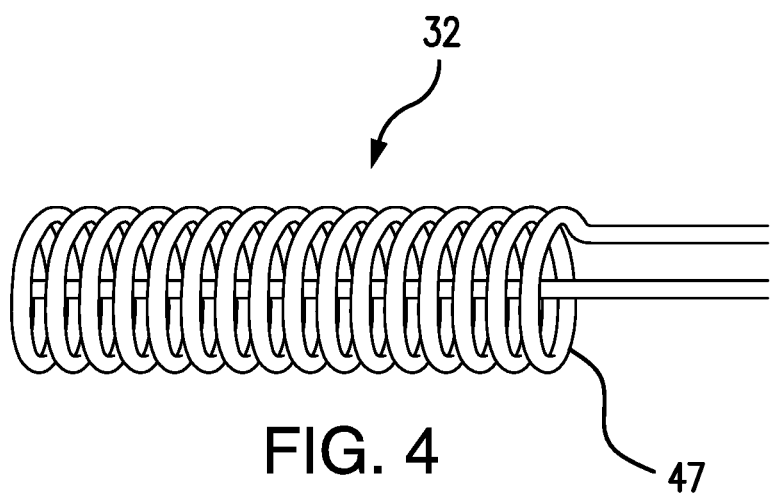
FIG. 4 shows an exemplary evaporator coil of the subject water cooling unit.
Figure 5:
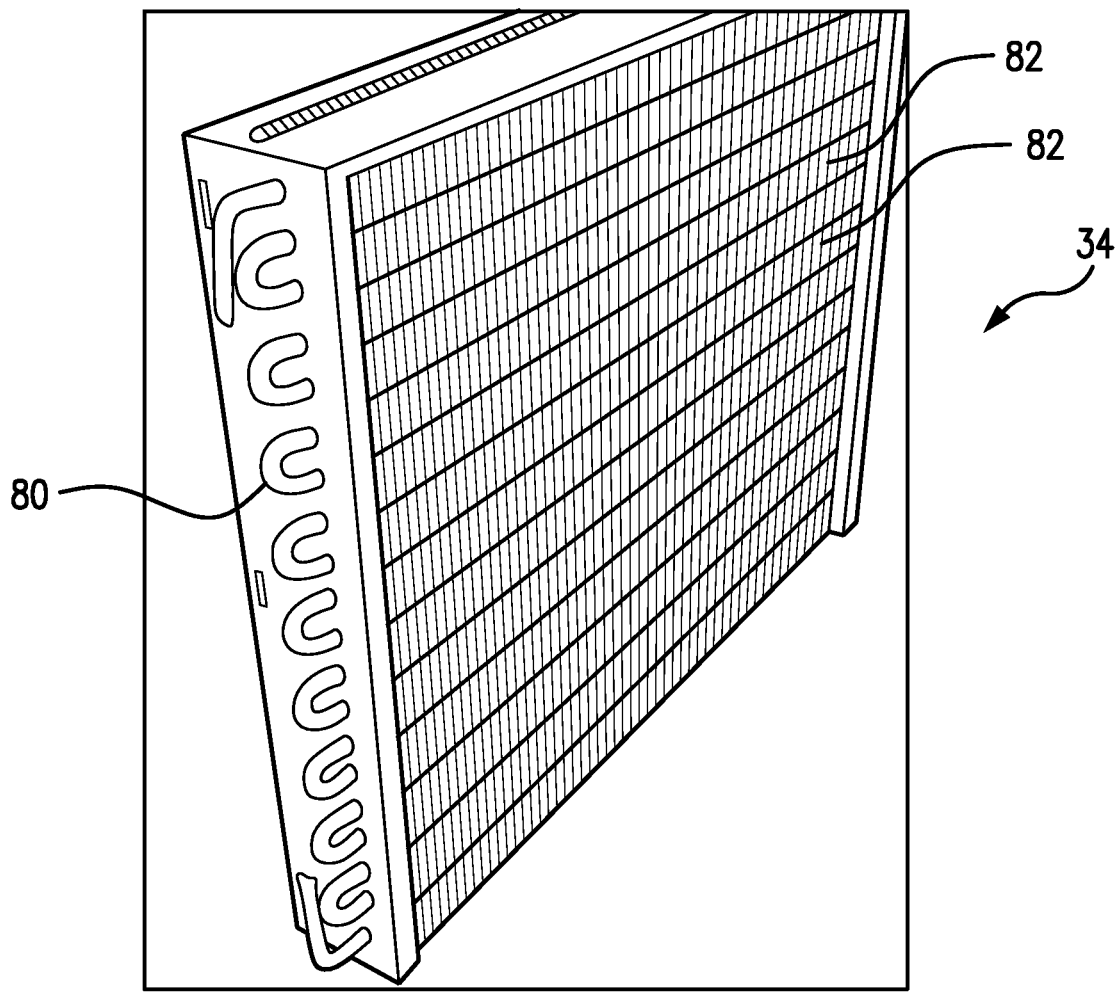
FIG. 5 shows an exemplary condenser heat exchange (HX) unit of the subject water cooling unit.

The evaporator HX unit 32 is immersed in the water tank 16 and can have full or partial contact with water 18 therein. The evaporator HX unit 32 can be formed from a hollow tube 47 coiled in various configurations, for example, as shown in FIG. 4. Alternative designs for the evaporator HX unit 32 may be presented by an array of small tubes to minimize the pressure drop. In addition, the evaporator HX unit 32 may be configured as a heat exchanger having area enhancement structures, such as fins attached to the hollow fluid tubes.

For the evaporator HX unit 32 fabricated with a single continuous tube 47 (such as shown in FIGS. 1, 3 and 4, the hollow tube diameter may be, for example, a minimum of 4 mm in order to avoid excessive pressure drop. Total length of the evaporator tubing may be 10 feet or longer. Minimal surface area of the subject evaporator HX unit 32, being in contact with water, may preferably be about 0.1 $m^2$.

Figure 10:
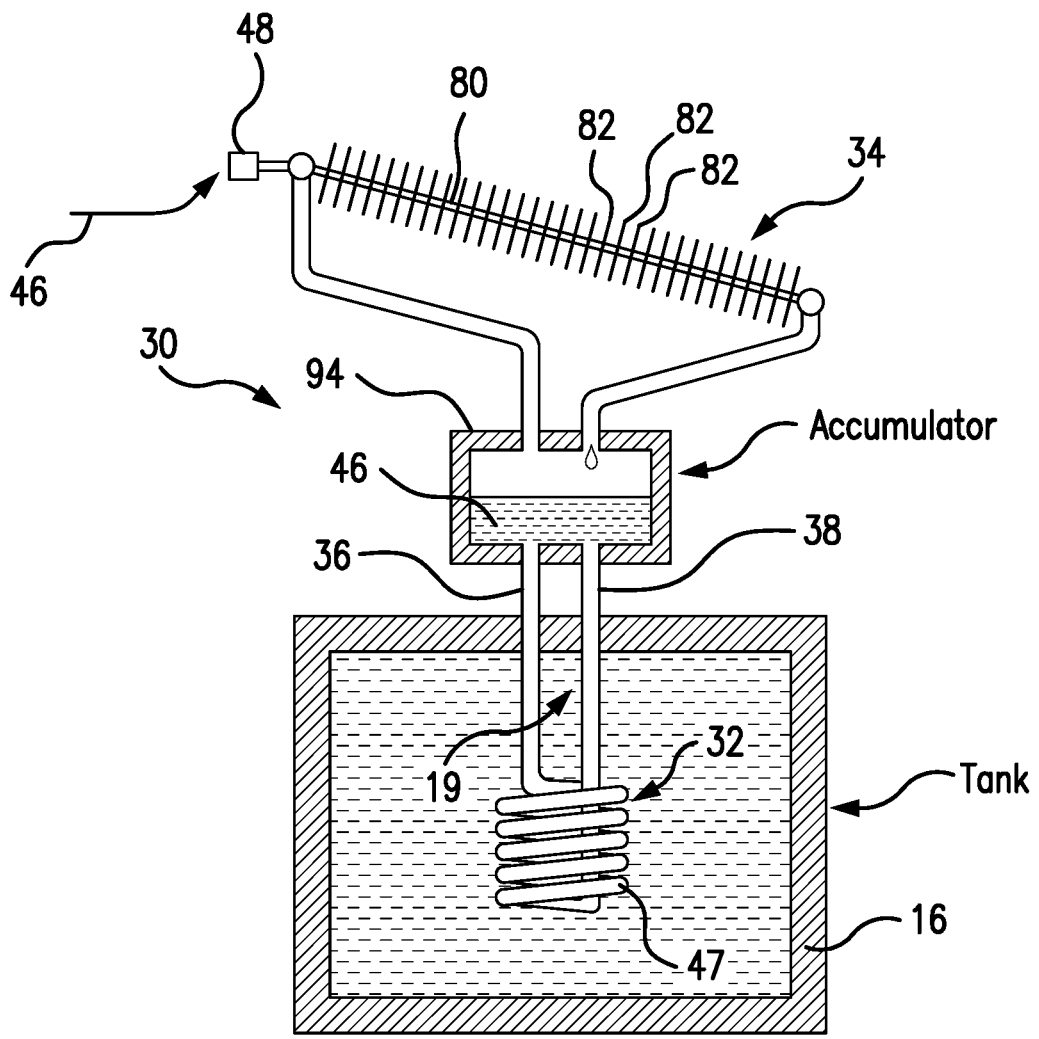
FIG. 10 is a schematic representation of another alternative embodiment of the subject water cooling unit equipped with an accumulator loop.

As shown in FIGS. 2-3 and 10, the HX loop 30 is partially charged with the working fluid (medium) 46 through the charge port 48 after evacuating the air from the HX loop 30. The working fluid 46 may be a refrigerant such as water, alcohols, CFCs, HFCs, ammonia or any other refrigerant which can perform sufficiently to start the cooling process even at a temperature difference as low as 0.2° C.-1.0° C. between the water filling the tank at the initial elevated temperature $T_1$ (to be cooled) and the ambient temperature ($T_3$).

The subject system operates whenever the ambient temperature T3 is below the water's initial elevated temperature T1. The temperature difference in question (0.2° C.-1.0° C.) is a minimum temperature difference (between the initial T1 and ambient T3) at which the system can begin the heat exchange to reduce the initial T1 to a goal temperature T2 which can approach and become equal to the ambient temperature T3. Thus, the subject system is operable at temperature differences between T1 and T3 ranging from such minimum temperature difference of 0.2° C.-1.0° C. and exceeding the minimum temperature difference.

The following are the stages of the subject system operation:

When the temperature $T_1$ of the water 18 in the water tank 16 is cooler than the outdoor temperature $T_3$, the refrigerant (working medium) 46 present inside the HX loop 30 remains at an equilibrium state where the saturation temperature $T_4$ of the working medium 46 is closer to the temperature $T_1$ of the water 18.

Since the outside ambient temperature $T_3$ is higher than the saturation temperature $T_4$, the vapors present in the external heat exchanger 34 do not condense and the HX loop 30 is not activated. This process is different from that of a typical single-phase thermosiphon which relies upon the density difference of the working medium inside the heat exchangers to move the working medium across the internal and external heat exchangers.

The use of the right working fluid for a specific ambient temperature range can ensure that the working medium recirculation starts at extremely low temperature differences between the water in the water tank and the ambient air. This temperature difference between $T_1$ and $T_3$ can be as low as 0.2° C.-1° C., whereas a typical single-phase thermosiphon requires about 3°-5° C. temperature difference to create a sufficient density difference to start the working medium recirculation.

When the water 18 in the water tank 16 has a temperature which is higher than the outdoor temperature $T_3$, the working medium (refrigerant) vapor present inside the condenser 34 starts to condense, and the liquid phase refrigerant starts to boil inside the evaporator 32. The condensed refrigerant inside the condenser 34 then returns back via the return loop conduit 38 to the evaporator 32 by means of gravity assist (or other methods, such as, for example, wicking). The condensation and evaporation processes continue until the water temperature in the tank becomes equal to the ambient temperature $T_3$.

When the outdoor temperature $T_3$ is higher than the tank water temperature, the temperature inside the condenser is higher than the saturation temperature $T_4$, and hence no condensation takes place and the cooling cycle does not operate. This prevents the tank water from heating when the ambient temperatures are hotter than the tank water temperature.

As the ambient air begins to cool down during winter season, the water inside the water tank also cools down. However, in order to ensure that the water temperature remains within ANSI temperature range of 16° C. to 38° C., the system 10 automatically shuts off the cooling process where sensing the water temperature lowered below a threshold limit which may be the goal temperature $T_2$. This can be achieved in several ways. For example, the subject system can use (a) thermostatic expansion valves which close below a certain temperature range, or (b) adding wax material to the cooling loop 30 which freezes (solidifies) within a desired temperature range at which the cooling operation needs to be stopped (as shown in FIGS. 2-3) to keep water in the water tank at the cooled temperature $T_2$.

As shown in FIG. 1, an enclosure 40 shown in FIG. 1 is provided which receives the water tank 16 therein. The enclosure 40 may be formed from a stainless steel, and is utilized to both enclose the insulated water tank 16, and to provide support for the condenser heat exchanger unit 34 and the water tank 16. The condenser heat exchanger unit 34 may be secured to the enclosure 40 with the help of connecting braces.

The condenser heat exchange unit 34 shown in FIGS. 1-3, 5, and 7-10 is designed to enhance the natural convection heat transfer. In one embodiment, the condenser HX unit 34 may be fabricated with the multitude of tube conduits 80 (for example, copper tubing) connected to headers 39, 41. The area of the condenser HX unit 34 can be increased by bonding fins 82 to the tube conduits 80 either by mechanical means (such as tube expansion, compression, etc.), or by soldering, brazing, or welding.

The fins may be fabricated as adjacent plates of a metal sheet (for example, Aluminum, Copper, etc.) to lie substantially parallel to each other.

The fin height of the condenser HX unit 34 can be designed differently for different applications. Fin height for a typical safety shower tank of volume approximately in the range of 300 liter to 1700 liter can be between 25 mm to 45 mm. These exemplary dimensions are favorable for the efficient natural convection heat transfer.

The fin spacing between the adjacent fins may range between 2 mm and 20 mm.

As shown in FIG. 3, the heat exchanger loop 30 may have headers 39 and 41. The header 39 is positioned at a slightly higher elevation than the header 41. Each of the conduits 80 in the condenser HX unit 34 is connected at the opposite ends of the headers 39, 41 and thus is inclined to the horizontal orientation as indicated in FIGS. 2-3 and 9-10.

Positioning of the header end 39 of the condenser HX unit 34 vertically higher than the header end 41 allows the condensate flow to naturally follow a specific direction. The height difference of the two ends 39 and 41 may be such that the condenser HX unit 34 forms an angle of 5-45° from the horizontal orientation. Such an angle ensures an easy flow of the working fluid 46 within the HX loop 30 via gravity without disrupting the natural convection of air around the fins. A higher angle may disrupt the natural convection of the air and can thus reduce the heat transfer.

The height of the header 39 from the bottom of the evaporator heat exchanger 32 is preferably minimum 0.3 meter and maximum 3.5 meter. The minimum height (0.3 m) is provided in order to ensure that there is enough head pressure of gravity in the tubing 38 of the HX loop 30. The maximum height (3.5 m) is chosen to avoid additional wind loads and to increase the compactness of the system.

The saturation temperature $T_4$ of the working medium 46 depends upon the heat transfer balance in the evaporator 32 and the condenser unit 34. If the heat transfer in the evaporator 32 is very small as compared to that in the condenser unit 34, the saturation temperature $T_4$ will be closer to that of the outside ambient temperature $T_3$. Thus, the temperature of the working medium 46 entering the condenser unit 34 will be very similar to that of the ambient air 29. This will result in a low temperature difference between the condenser surface and outside air, and thus will result in reduction of the overall performance of the system. In order to ensure that the saturation temperature $T_4$ remains close to the water temperature $T_1$, heat transfer area evaporator HX 32 should be at least $\frac{1}{20}^{th}$ of that of condenser unit 34. In other words, the heat transfer area (in contact with water) of the evaporator HX unit 32 may vary between 0.05 times to 10 times that of the heat transfer area (in contact with air) of the condenser heat exchanger 34. Such area requirement is chosen considering the fact that the overall heat transfer coefficient inside the evaporator HX unit 32 is usually much higher than that in the condenser HX unit 34 due to it being liquid-liquid heat transfer.

The fluid tubes 80 can either be connected by the opposite ends to the headers 39 and 41, or be formed in serpentine configuration having one inlet and one outlet. In both embodiments, either using the headers configuration or the serpentine configuration, multiple headers, multiple layers of parallel conduits, and multiple serpentine tubes can also be used to enhance the heat transfer and to reduce the pressure drop in the system.

The overall foot print area of the condenser HX unit 34 may range between 0.2 m$^2$ and 4 m$^2$ for most of the cases where natural convention is used. In cases where the fan assisted cooling of the HX unit exchanger 34 is utilized, the foot print area can be as low as 0.02 m$^2$.

The condenser HX unit 34 using the headers configuration shown in FIGS. 3 and 9-10, is useful for situations where the pressure drop in the fluid conduits 80 is high. In such cases, the serpentine configuration may cause a higher pressure drop which tends to reduce the fluid flow rate.

The size of the tank 16 depends upon the application of the cooling unit 14. For the safety shower applications, the tank size may vary from 300 liter to 1700 liter for a single safety shower. In cases where the same tank is used to supply water to the multiple safety showers, the tank size will be larger. For the residential applications, the tank size may vary between 200 liters to 5000 liters, with the range between 500 liters to 3000 liters being most common.

The water tank 16 shown in FIGS. 1-3 and 7-10, contains water 18 to be cooled. Typical safety showers are of two major types: 1) overhead tank safety showers and 2) tubular safety showers. Overhead tank showers contain water at the atmospheric pressure where the tank is usually positioned at about 2-2.5 meter elevation from the ground with a shower head connected at the bottom of the tank. Water dispensing via the showerhead is accomplished by the gravity assist inside the tank. Tubular safety showers 12, as shown in FIGS. 1 and 2, on the other hand depend upon the supply water pressure to dispense the water from the shower heads. The supply pressure of the water source 28 could range between 2-8 bars. Thus, to provide cooling water to such shower systems, the cooling system 10 uses the water tank 16 which is pressurized at and can withstand the pressures ranging between 2-8 bars. The water tank 16 is adapted for pressurized systems (tubular showers) and is designed to withstand pressures in the range of 2-8 bars, and is capable of operating in conjunction with a pressure relief valve 50 shown in FIG. 2.

The water tank 16 is designed in a form of a hollow well insulated receptacle 17, totally or partially enclosed in the enclosure 40.

The water inlet line 20 may be equipped with a pressure relief valve 54, and the water outlet line 26 may be isolated via a valve 53 from the end water user, such as a shower system 12. A ball valve 52 may be installed to isolate the inlet and outlet lines one from another, and to isolate the water tank from the supply line 20.

The water tank 16 is fabricated to ensure that a minimum heat transfer takes place between the tank 16 and the ambient air 29 outside of tank 16. A calculation for insulation thickness shows that about 1-2 inches of insulation 71 (shown in FIGS. 2-3) will be sufficient for the purpose. Since the water tank 16 is not exposed to extremely cold/hot temperature changes, any cost effective/easy to install insulation material 71 can be used. When mass manufactured, Styrofoam (extended polystyrene foams) insulation may be cost effective for the purpose.

Water connections to the tank 16 and to the shower 12 are shown in FIGS. 1-3. These include the water inlet piping 20 and the water outlet piping 26. Water inlet piping 20 comes from a water supply source 28 and is connected to the water tank 16. As best shown in FIG. 2, the inlet piping 20 extends to the top of the water tank 16 to ensure that the incoming water is not mixed with the cooled water during the shower activation. The outlet piping 26 connects the water through the bottom lid 24 to the safety shower 12.

The bleed valve 50 (shown in FIG. 2) is used for the initial stage of the water filling process to ensure that no air is trapped in the tank 16 during the process. It will only be used during the initial operation, and will not be needed after the actuation of the shower system.

Figure 6:
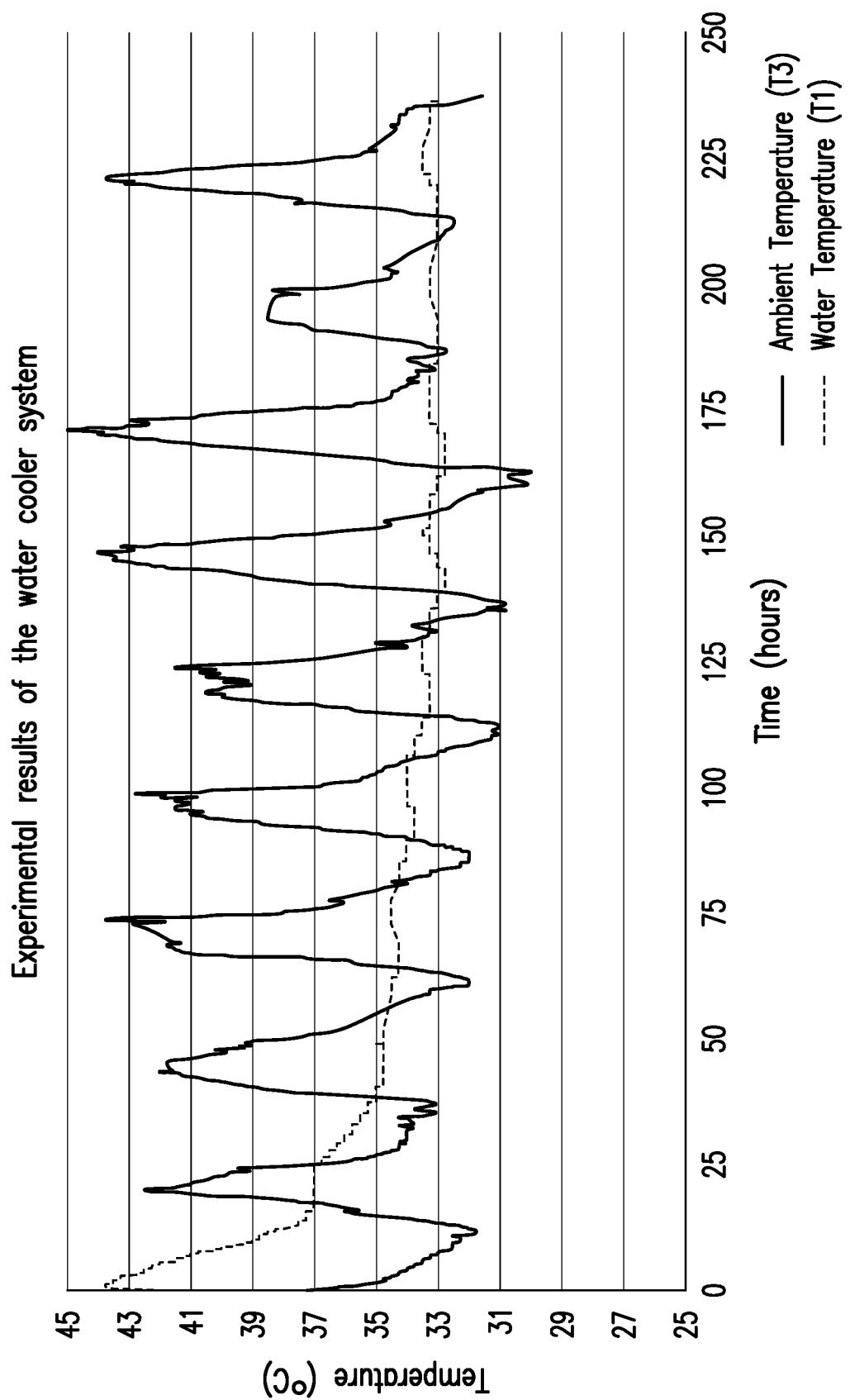
FIG. 6 is a diagram representative of the test results for water temperature in correspondence with the outer (ambient) temperature.

The subject water cooling system was built and tested in the Middle East (Abu Dhabi, United Arab Emirates) during hot summer months. The outdoor temperatures during the test periods went as high as 50° C. The water in the tank 16 was initially heated to about 45° C. and then was allowed to cool by the subject cooling system. As shown in the diagram in FIG. 6, the water temperature begins to drop quickly and then stabilizes a few degrees above the minimum temperature of the day. The cooling begins as soon as the outdoor (ambient) temperature is below the water temperature. During the day, when the outdoor temperatures are high, the water temperature increases due to the heat gain in the water tank. However, this gain is only about 0.5° C.-1.0° C. The results show that the operation of the subject system ensured that the water temperatures remain within ANSI requirements even during the hottest days.

Figure 7:
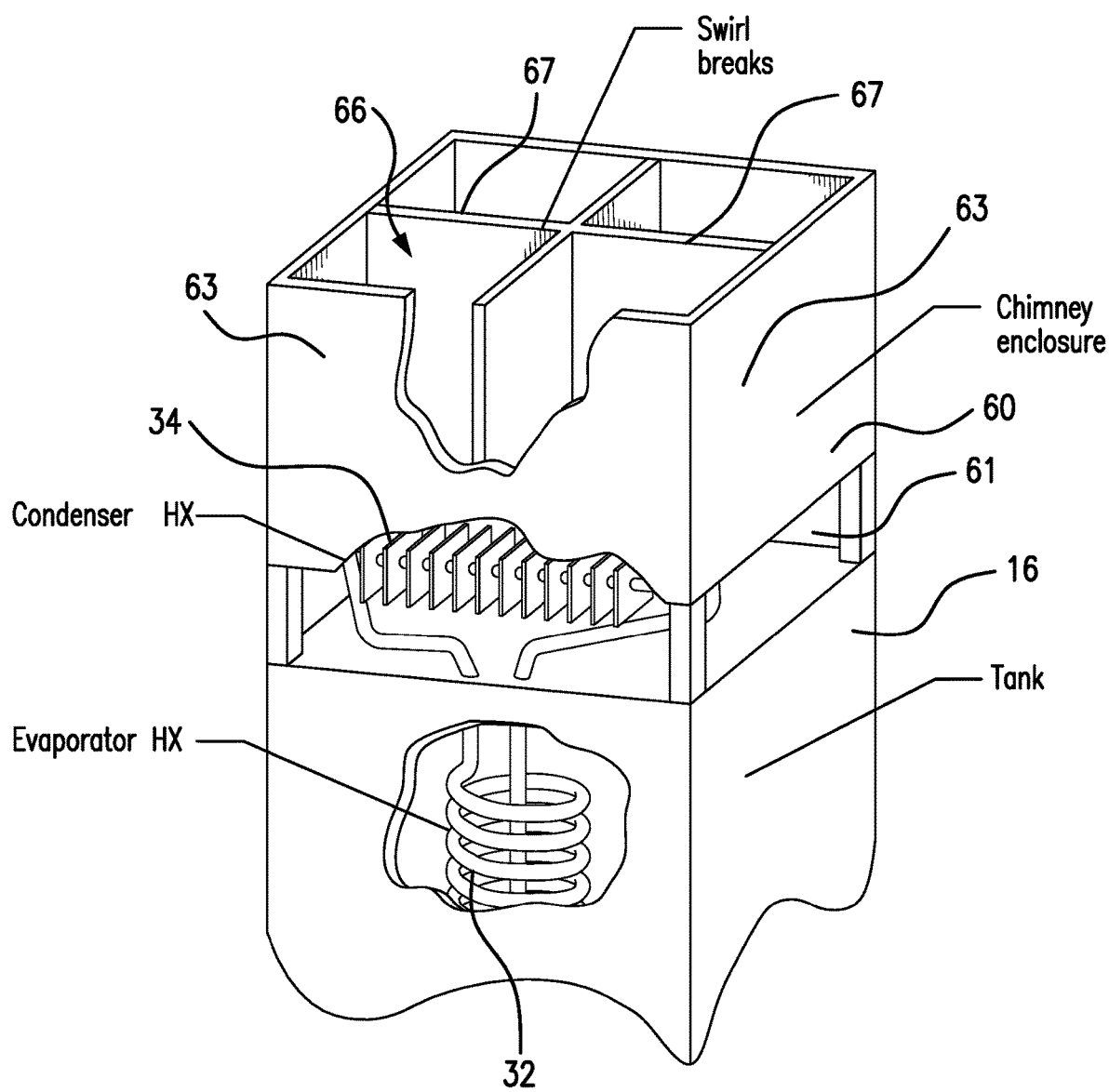
FIG. 7 shows schematically an alternative embodiment of the subject cooling unit equipped with the chimney enclosure coupled to the condenser HX unit.

In an alternative embodiment, shown in FIG. 7, an enclosure (chimney enclosure) 60 may be placed in surrounding relationship with the condenser HX unit 34 in order to create a chimney effect. Chimney effect is achieved when the hot rising air is given extra space above to rise further before meeting with the same density air. The volume immediately above the condenser HX unit 34 is enclosed with the enclosing members 63, which may be of various shapes. The height of the enclosure 60 above the heat exchanger 34 may vary by 2-15 times the height of the heat exchanger 34. A practical height for the chimney enclosure 60 can range between 0.2 m and 1.5 m.

As shown in FIG. 7, the enhancement via the chimney enclosure 60 will require that there is an empty space 61 below the chimney enclosure 60 for air to flow through the condenser HX unit 34.

The empty space 61 between the top of the water tank 16 and the condenser HX unit 34 may be configured with openings formed in the chimney enclosure 60, or be just an open space.

The chimney enclosure 60 increases the heat transfer across the condenser 34 up to 6 times over the design devoid of the chimney enclosure. The experiments and simulation results demonstrated that an increase of the heat duty of the system up to 600% may be attained by adding a small enclosure 60 on top of the condenser HX unit 34. In many applications (including safety shower cooling), where the heat transfer relies on the natural convection heat transfer to the ambient atmosphere, such enhancement may reduce the overall cooling time from a few days to a few hours.

Figure 8:
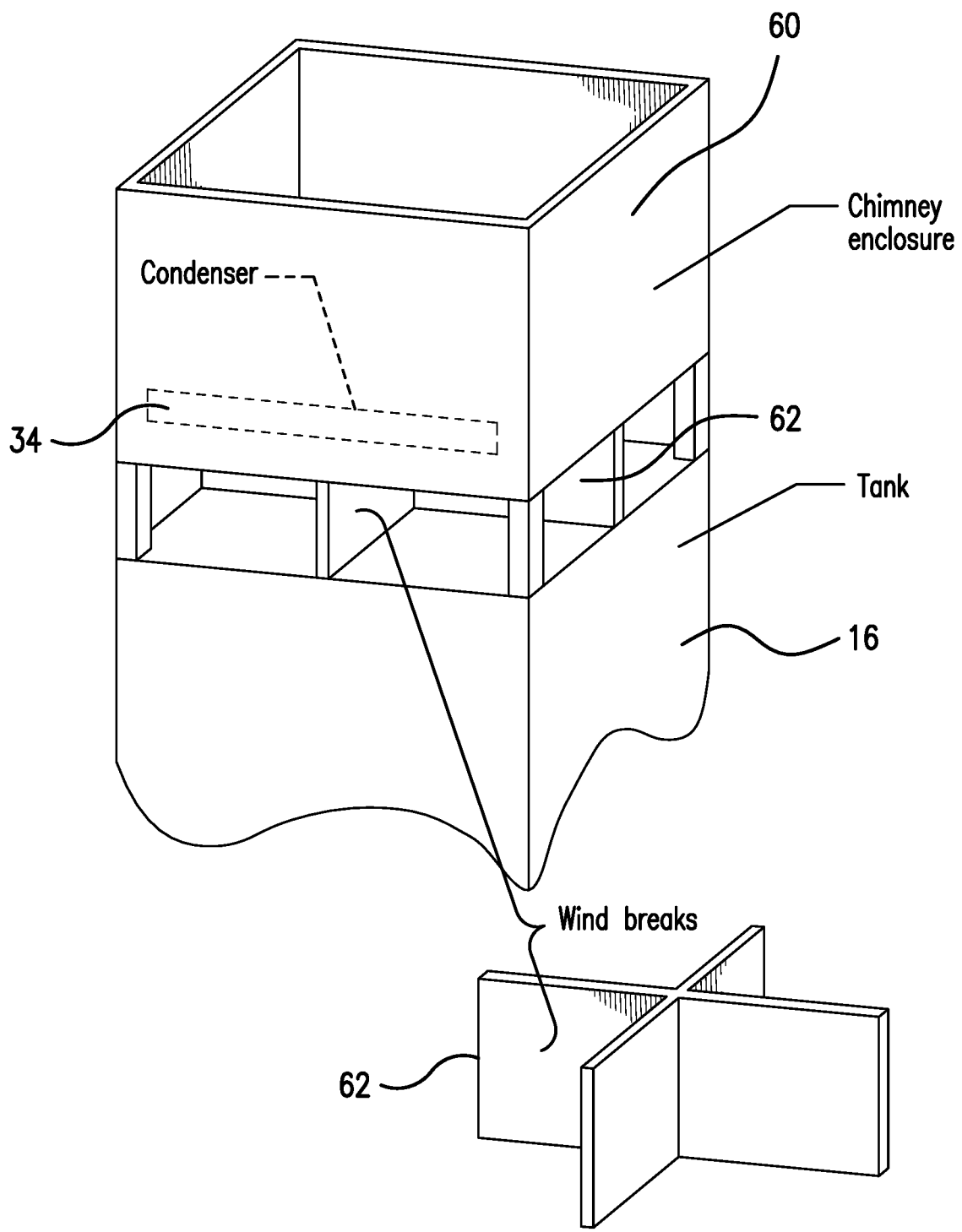
FIG. 8 is a schematic representation of another alternative embodiment of the subject cooling unit equipped with the wind-breaking structure.

In another alternative embodiment, shown in FIG. 8, a vertical windbreak member 62 may be located below the condenser HX unit 34 to restrict the wind flowing from any direction by redirecting the wind vertically upward into the condenser heat exchanger unit 34.

As discussed in previous paragraphs, the chimney effect can increase the heat duty of the subject system. However, wind can adversely affect the chimney effect. The reason behind that is that the wind flowing across the chimney enclosure 60 tends to create low pressure zones at the inlet and the outlet of the chimney enclosure 60. This low pressure causes the recirculation of the air inside the enclosure 60, and hence hot air cannot escape the enclosure, causing the reduction of heat transfer.

Thus, in order to avoid this situation, and use the wind to increase the heat transfer, wind breaks 62 are introduced. Wind breaks, shown in FIG. 8, break the flow of the wind at the bottom of the enclosure 60 either fully or partially, and guide the wind flow into the enclosure 60. Thus, wind passes through the heat exchanger 34, enhancing the heat transfer in it.

The wind break mechanism 62 can be in any configuration which is capable of stopping and redirecting the wind into the enclosure 60. It may be fabricated, for example, as a simple structure by adding additional solid plates or perforated plates placed below the heat exchanger 34. The plates can be arranged in such a way that they stop the wind from all directions and guide it into the enclosure 60. For example, cross plates positioned close to the center of the enclosure 60, or multiple plates and cross plates of different heights, may be good candidates for the wind-break mechanism.

The wind break 62, in addition to stopping the wind flow and redirecting it into the chimney enclosure, also creates high pressure at the enclosure bottom, and hence the air flow occurs naturally from the bottom of the enclosure 60 (where the air pressure is high) to the top of the enclosure (where the air pressure is low).

Returning to FIG. 7, swirl breaks 66 are used to break the swirl (or cyclic flow) of the air within the enclosure 60. Although the wind breaks 62 enhance the heat transfer, their effect is not fully realized as the design of the wind breaks may force the wind to flow only through a portion of the heat exchanger. This imbalance of air flow in a portion of the enclosure 60 causes the circular (eddy like) flow inside the enclosure volume. Since the same air circulates via the heat exchanger, an insufficient fresh cold air may be available to cool a portion of the condenser HX unit 34 which negatively affects the heat transfer. Swirl breaks 66 resolve the issue by breaking this cyclic air flow.

As the swirl is reduced, the air flow in and out of the enclosure 60 via the heat exchanger 34 increases, which, in turn, enhances the heat transfer significantly.

The swirl breaks 66 are the structures present within the enclosure 60, which strategically divide the enclosure volume in such a way to stop the circular swirl flow of the air. One way to create the swirl break is to break the volume into two or more parts with the means of partition plates 67, as shown in FIG. 7.

For the application where a minimum desired temperature $T_2$ of the water being cooled is greater than the ambient minimum temperature $T_3$, such as those typical during the winter months, the cooling process needs to be stopped once a certain low temperature $T_2$ of the water is reached. This can be achieved by adding a thermally actuated valve which shuts the connection between the internal and external heat exchangers. A number of different types of valves can be used for this purpose. As shown in FIGS. 2-3, one cost-effective way to accomplish this, is by adding a phase changing material 65 into the HX loop 30, along with the working fluid 46. The phase changing material 65 is selected in such a way that it ensures that the desired water temperature $T_2$ is maintained inside the water tank. The phase changing material 65 solidifies at the temperature close to the desired minimum temperature of the water in the water tank 16.

For example, as shown in FIGS. 2-3, the phase changing material 65 can be injected inside the loop 30 which needs to be blocked, along with the working medium 46. The phase changing material 65 is selected from a group of materials which do not chemically interact with the working medium 46, to prevent degradation of the performance of the HX loop 30. Sufficient amount of the phase changing material is used to ensure that, when it solidifies, it blocks the HX loop 30, as shown in FIG. 3. The phase changing material 65 is usually lighter than the working fluid 46.

During installation, a pump 72 driven by an electric motor 74 (shown in FIG. 2), air motor or any other drivers, may be used to pump the fluid (refrigerant) 46 from the evaporator coil 32 (within the water tank 16) into the heat exchanger unit 34.

In one of the alternative embodiments, the condenser unit 34 and the evaporator coil 32 are not directly connected, but have an additional (auxiliary) heat exchanger 76 provided therebetween as shown in FIG. 9. In this alternative embodiment, the additional heat exchanger 76 exchanges heat between the condenser unit 34 and the evaporator coil 32. This additional heat exchange loop 76 offers an additional benefit. The working fluid required for the external heat exchanger 34 needs a relatively high pressure and may be regarded as hazardous for the human consumption. The additional internal loop 76 can be driven with the help of a working fluid B which is considered safe, such as, for example, water or alcohol. The working fluid A is filled in the evaporator loop 32 via the charge port 90, and the working fluid B is filled in the condenser loop 34 via the charge port 92.

The working principles of the embodiment shown in FIG. 9 are similar to the embodiment shown in FIGS. 2-3 with an additional step in between. When the outside temperature $T_2$ is cooler than the water temperature $T_1$, the working fluid A will boil in the evaporator 32, and the vapors of the working medium A will reach the auxiliary heat exchanger 76. Within the auxiliary heat exchanger 76, these vapors from the evaporator loop (fluid A) will condense by giving up the heat to the condenser loop's working fluid (fluid B). The condensed working fluid from the condenser 34 will then return to the evaporator 32 where it boils again and the circulation continues.

The working fluid B, upon gaining the heat from the fluid A evaporates within the auxiliary heat exchanger 76, and rise to the condenser 34. Since the condenser's temperature is cooler due to cooler ambient temperature $T_3$, the fluid B vapor condenses within the condenser 34 and returns to the auxiliary heat exchanger 76, where they will evaporate again by gaining heat from the fluid A, and the cycle continues until the ambient temperature $T_3$ and water temperature $T_1$ are equal.

In still another embodiment, the evaporator coil 32 (which constitutes an internal heat exchanger of the heat exchange loop 30), may be configured as an array of one or more internally sealed heat pipes which are connected to the external heat exchanger (condenser unit 34) in such a way that the working fluids charged into the condenser unit 34 and the additional heat exchanger 76 are not mixed one with another.

Another embodiment of the present invention uses the cooling device 14 along with the water tank 16 which can hold pressures ranging between 4 bars and 8 bars or higher. Usual water supply pressure, for example, in a safety shower supply pipe line ranges between 2 bars to 8 bars. A tubular safety shower is directly connected to this water supply. In the alternative embodiment of the invention, the evaporator heat exchanger 32 can be inserted into an insulated tank which can hold such pressures. The tank is connected to the main water supply line and hence is under the same pressure as the water supply pressure. Another pipe is connected from the tank to the tubular safety shower and water is supplied to the tubular safety shower as soon as it is activated. The shower in this type of system can be a safety shower, eye-wash and safety shower or eye-wash only. The shower can also be a handheld type. Similarly, the cooled water can be used for applications other than safety showers where cool water is required.

In an additional embodiment of the present invention, shown in FIG. 10, the subject system connects the evaporator heat exchanger 32 and condensers 34 via an accumulator 94 instead of a direct HX loop. The accumulator 94 can store additional amount of working fluid 46 and hence can be useful in certain applications.

There are numerous benefits of the subject technology:

1) The system meets ANSI temperature requirements by cooling the water in hot climates at night or during times of cooler ambient temperatures. It also prevents overcooling during winter by turning off the cooling at a set minimum temperature.

2) Unlike the chillers, the subject system requires minimum energy to cool the water and is completely passive.

3) Low system cost: Due to the simplicity of the system configuration, the cost of the cooling system is much lower than that of chiller system.

4) No moving parts/high reliability: Due to the absence of moving parts the reliability of the system is high as there is no wear and tear due to friction, lack of lubrication, etc. Once the cooling loop is sealed, it can run for extended times without the need of any maintenance other than cleaning in case the condenser becomes clogged with dirt, etc.

5) Almost zero operating cost: The system is completely passive, and thus does not require ongoing operating expense.

6) Low installation cost: Due to the compact design and lower weight, the cooling system installation cost is lower. It does not require any specialized equipment for installation. As the system doesn't need electricity to power itself, the installation of electric cables is avoided. These electric installation costs are high in a process plant setting as the nearby outlets are typically not present or do not have enough ampere rating to support chilled systems. The underground or overhead cables drawing from longer distances is expensive and can be avoided by the present invention.

7) Faster installation: Due to the reasons mentioned above, the installation time is faster. Hundreds of safety showers can be retrofitted or installed within a matter of days due to the simple installation process.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of elements, steps, or processes may be reversed or interposed, all without departing from the spirit or scope of the invention as defined in the appended claims.

What is claimed is:

1. A water cooling system, comprising:
a water tank with an upper lid and a lower lid, the water tank filled with water at a temperature $T_1$,
at least one heat exchange (HX) loop in contact with the water in said water tank, said HX loop operating to cool said water in said water tank to a temperature $T_2$, wherein $T_1 > T_2$,
said at least one HX loop being configured with:
an evaporator HX unit positioned in said water tank in contact with said water,
a condenser HX unit positioned outside said water tank in operative coupling to said evaporator HX unit via a loop tubing system, said condenser HX unit being exposed to an external air having an ambient temperature $T_3$, wherein said loop tubing system of said at least one HX loop includes:
an inlet tubing line and a return tubing line operatively coupling said evaporator HX unit and said condenser HX unit, thus forming said at least one HX loop, wherein at least one working medium filling said at least one HX loop circulates from said evaporating HX unit to said condenser HX unit through said inlet tubing line and returns from said condenser HX unit to said evaporator HX unit along said return tubing line, and the at least
one working medium partially filling said at least one HX loop and circulating between said evaporator HX unit and said condenser HX unit via said loop tubing system, thus cooling said water in said water tank from the temperature $T_1$ to the temperature $T_2$ wherein the system further includes:
a phase-changing medium in addition to at least one working medium filling said at least one HX loop, wherein said phase changing medium solidifies at the temperature $T_2$ in said receptacle, thus stopping said at least one working medium from circulating through said at least one HX loop; and
a chimney enclosure positioned on the top of said condenser HX unit in a surrounding relationship therewith, wherein a height of said chimney enclosure ranges from 2 to 15 times of a depth of said condenser HX unit, and wherein said chimney enclosure is configured with a plurality of compartments.

2. The system of claim 1, wherein said water tank is a fluidly sealed receptacle defined between a bottom portion and a top portion of said water tank, said system further comprising:
a water inlet pipe extending in fluid communication with said receptacle to supply said water having said temperature $T_1$ in said receptacle, and a water outlet piping extending in fluid communication with said receptacle to output cooled water having said temperature $T_2$.

3. The system of claim 1,
wherein, when $T_1 > T_3$, said at least one working medium absorbs heat produced by said water filling said receptacle, resulting in said at least one working medium boiling in said evaporator HX unit, thus forming the working medium vapor,
wherein said working medium vapor passes through said inlet tubing line into said condenser HX unit, and, being exposed to said lower temperature $T_3$ of the external air, condenses in said condenser HX unit, thus forming a condensate of said at least one working medium, said condensate returning from said condenser HX unit to said evaporator HX unit through said return tubing line, thus cooling said water in said receptacle of said water tank.

4. The system of claim 3, further comprising an accumulator loop interconnected within said at least one HX loop between said condenser HX unit and said evaporator HX unit to store therein said at least one working medium.

5. The system of claim 1, wherein said condenser HX unit and said evaporator HX unit are disposed in vertically aligned relationship one with respect to another, and wherein said condensate of said at least one working medium travels to said evaporator HX unit under influence of gravity assist.

6. The system of claim 1, wherein a difference between said temperatures $T_1$ and $T_3$ at which the heat exchange takes place ranges from 0.2° C. to 1° C.

7. The system of claim 1, wherein said condenser HX unit is tilted between 5°-45° from a horizontal orientation.

8. The system of claim 1, further including a least one wind break attached at a bottom of said condenser HX unit to direct ambient wind vertically upward into said condenser HX unit.

9. The system of claim 1, wherein said condenser HX unit is a heat exchanger including at least one multi-port tube and a plurality of fins, said fins being spaced apart one relative to another at a distance ranging between 2 mm and 20 mm.

* * * * *